United States Patent [19]

Hisakuni

[11] Patent Number: 4,911,550
[45] Date of Patent: Mar. 27, 1990

[54] OPTICAL TYPE DISPLACEMENT MEASURING APPARATUS

[75] Inventor: Akira Hisakuni, Amagasaki, Japan

[73] Assignee: Mitsubishi Denki Kabushiki Kaisha, Tokyo, Japan

[21] Appl. No.: 241,896

[22] Filed: Sep. 8, 1988

[30] Foreign Application Priority Data

May 23, 1988 [JP] Japan .................................. 63-123932

[51] Int. Cl.⁴ ............................................. G01C 3/00
[52] U.S. Cl. ....................................... 356/376; 356/1; 356/152
[58] Field of Search ................... 356/1, 152, 376, 375, 356/371, 138; 250/201

[56] References Cited

U.S. PATENT DOCUMENTS

| | | | |
|---|---|---|---|
| 4,761,546 | 8/1988 | Ikari et al. | 356/1 |
| 4,789,243 | 12/1988 | Mathur | 356/152 |
| 4,798,469 | 1/1989 | Burke | 356/376 |

FOREIGN PATENT DOCUMENTS 56-10561 3/1981 Japan .
59-762 1/1984 Japan .

OTHER PUBLICATIONS

4. Constitution, No. 82 Opius E, pp. 66–72; Sep. 1986.

Primary Examiner—Richard A. Rosenberger
Attorney, Agent, or Firm—Wolf, Greenfield & Sacks

[57] ABSTRACT

An optical type displacement measuring apparatus according to this invention is furnished with an angle correction conversion table memory which stores therein correctional coefficients corresponding to angle signals expressive of the inclination angles of objects to-be-measured, in addition to a displacement value conversion table memory which stores therein displacement values corresponding to displacement signals, and it further comprises a head scanning unit which moves a head relative to an object to-be-measured, and an arithmetic circuit which drives the head scanning unit and which calculates an angle signal on the basis of displacement values for a plurality of points on the object to-be-measured and corrects the displacement values on the basis of correctional coefficients corresponding to this angle signal, the corrected displacement values being delivered as outputs.

1 Claim, 4 Drawing Sheets

FIG. 2

| DISP SIG S | DISP VAL P |
|---|---|
| −1.0 | |
| ⋮ | ⋮ |
| $S_B$ | $P_B$ |
| ⋮ | ⋮ |
| $S_A$ | $P_A$ |
| ⋮ | ⋮ |
| +1.0 | |

FIG. 3

| ANGLE SIG : T | CORR COEF : K | | | |
|---|---|---|---|---|
| | a | b | c | d |
| ⋮ | ⋮ | ⋮ | ⋮ | ⋮ |
| $\tan\theta$ | $a_1$ | $b_1$ | $c_1$ | $d_1$ |
| ⋮ | ⋮ | ⋮ | ⋮ | ⋮ |

# OPTICAL TYPE DISPLACEMENT MEASURING APPARATUS

BACKGROUND OF THE INVENTION

This invention relates to an optical type displacement measuring apparatus which finds a displacement (distance) to an object to-be-measured by the use of a light source and a position sensing device (PSD). More particularly, it relates to an optical type displacement measuring apparatus which can eliminate a measurement error ascribable to the inclination of an object to-be-measured.

FIG. 5 is a block diagram of an optical type displacement measuring apparatus in a prior art described in, for example, an article "Laser Distance Sensing" in a magazine "O Plus E" (No. 82, September 1986), the apparatus being redrawn by the inventor in order to facilitate understanding.

Referring to the FIGURE, a head 1 for measuring a displacement includes a light source 11, a light source driver circuit 12 which drives the light source 11, a light projecting lens 13 by which a light beam L from the light source 11 is condensed on an object to-be-measured (not shown), a light receiving lens 14 which condenses light regularly reflected or scattered from the object to-be-measured, a PSD 15 by which the regularly reflected light or scattered light received is converted into two channels of current signals $I_1$ and $I_2$, and preamplifiers 16 and 17 which convert and amplify the respective current signals $I_1$ and $I_2$ into voltage signals $V_1$ and $V_2$.

An analog switch 2 turns the two channels of voltage signals $V_1$ and $V_2$ into one channel, whereupon a buffer amplifier 3 amplifies the voltage signals $V_1$ and $V_2$ of one channel.

An arithmetic circuit 4 includes a sample-and-hold circuit 41 in which the voltage signals $V_1$ and $V_2$ passed through the buffer amplifier 3 are held, an A/D (analog-to-digital) converter 42 by which the respective voltage signals $V_1$ and $V_2$ from the sample-and-hold circuit 41 are converted into digital signals $D_1$ and $D_2$, and a CPU 43 which delivers the displacement value P of the object to-be-measured on the basis of the digital signals $D_1$ and $D_2$.

A displacement value conversion table memory 5 connected to the CPU 43 stores therein the displacement value P which corresponds to a displacement signal S calculated on the basis of the digital signals $D_1$ and $D_2$.

Next, the operation of the prior-art, optical type displacement measuring apparatus shown in FIG. 5 will be described.

When a light source turning-on command is issued by the CPU 43, the light source driver circuit 2 drives the light source 1 made of an LD (laser diode) or an LED (light emitting diode). The light beam L emitted from the light source 1 is thrown on the object to-be-measured through the light projecting lens 13, and is regularly reflected (or is scattered) on the object to-be-measured. The regularly reflected light (or scattered light) is passed through the light receiving lens 14 into a light beam of small diameter, which is focused on one point of the PSD 15 at a position corresponding to the displacement (distance) of the object to-be-measured.

The PSD 15 converts the focused light beam into the two channels of current signals $I_1$ and $I_2$ corresponding to the position and intensity of the light beam, and delivers them from both the ends thereof. Here, letting I denote a current signal which corresponds to the total intensity of the received light beam, the following holds:

$$I = I_1 + I_2$$

The current signals $I_1$ and $I_2$ are respectively converted and amplified into the voltage signals $V_1$ and $V_2$ by the preamplifiers 16 and 17. Further, these voltage signals are brought into one channel in time-division fashion by the analog switch 2 and are amplified by the buffer amplifier 3, whereupon they are applied to the arithmetic circuit 4.

After the voltage signals $V_1$ and $V_2$ have been held in the sample-and-hold circuit 41, they are converted by the A/D converter 42 into the digital signals $D_1$ and $D_2$, which are fed into the CPU 43. On the basis of the digital signals $D_1$ and $D_2$, the CPU 43 calculates the displacement signal S ($-1 \leq S \leq 1$) which is given by:

$$S = (D_1 - D_2)/(D_1 + D_2) \tag{1}$$

It obtains the displacement value P corresponding to the displacement signal S from the displacement value conversion table memory 5, and delivers this displacement value P. Alternatively, in a case where the displacement value conversion table memory is not employed, the displacement value P is obtained in such a way that a correctional calculation is performed by multiplying the displacement signal S by a coefficient.

However, assuming that the surface of the object to-be-measured 10 is not perpendicular to the light beam L but inclines an angle $\theta$ as illustrated in FIG. 6, a light spot which is formed on the surface of the object to-be-measured 10 by the light beam L has a certain degree of diameter, and hence, the regularly reflected light (or the scattered light) is disturbed delicately. Accordingly, an error is involved in the displacement signal S based on the current signals $I_1$ and $I_2$, to eventually incur an error in the delivered displacement value P. FIG. 7 is a graph of the relationship between the displacement value P and the error H as has been experimentally obtained. The graph indicates that, as the inclination angle $\theta$ and the displacement value P enlarge more, the error H becomes greater.

As stated above, the optical type displacement measuring apparatus of the prior art directly delivers the displacement value P based on the displacement signal S. Therefore, it has had the problem that, in the case where the surface of the object to-be-measured 10 inclines relative to the optical axis of the head 1, the current signals $I_1$ and $I_2$ from the PSD 15 change to contain errors, so the displacement value P of the object to-be-measured 10 changes apparently.

SUMMARY OF THE INVENTION

This invention has been made in order to solve the problem as mentioned above, and has for its object to provide an optical type displacement measuring apparatus which can always deliver an accurate displacement value even when an object to-be-measured inclines relative to a head.

An optical type displacement measuring apparatus according to this invention is furnished with an angle correction conversion table memory which stores therein correctional coefficients corresponding to angle signals expressive of the inclination angles of objects to-be-measured, in addition to a displacement value conversion table memory which stores therein displacement values corresponding to displacement signals, and it further comprises a head scanning unit which moves a head relative to an object to-be-measured, and an arithmetic circuit which drives the head scanning unit and which calculates an angle signal on the basis of displacement values for a plurality of points on the object to-be-measured and corrects the displacement values on the basis of correctional coefficients corresponding to this angle signal, the corrected displacement values being delivered as outputs.

In this invention, the displacement values of the respective points are corrected in conformity with the inclination angle of the object to-be-measured, and the accurate displacement values are delivered at all times irrespective of the surface state of the object to-be-measured.

BRIEF DESCRIPTION OF THE DRAWINGS

FIG. 2 is an explanatory diagram showing the contents of a displacement value conversion table memory;

FIG. 3 is an explanatory diagram showing the contents of an angle correction conversion table memory;

Throughout the drawings, the same symbols indicate identical or equivalent portions.

DESCRIPTION OF THE EMBODIMENTS

Figure 1:
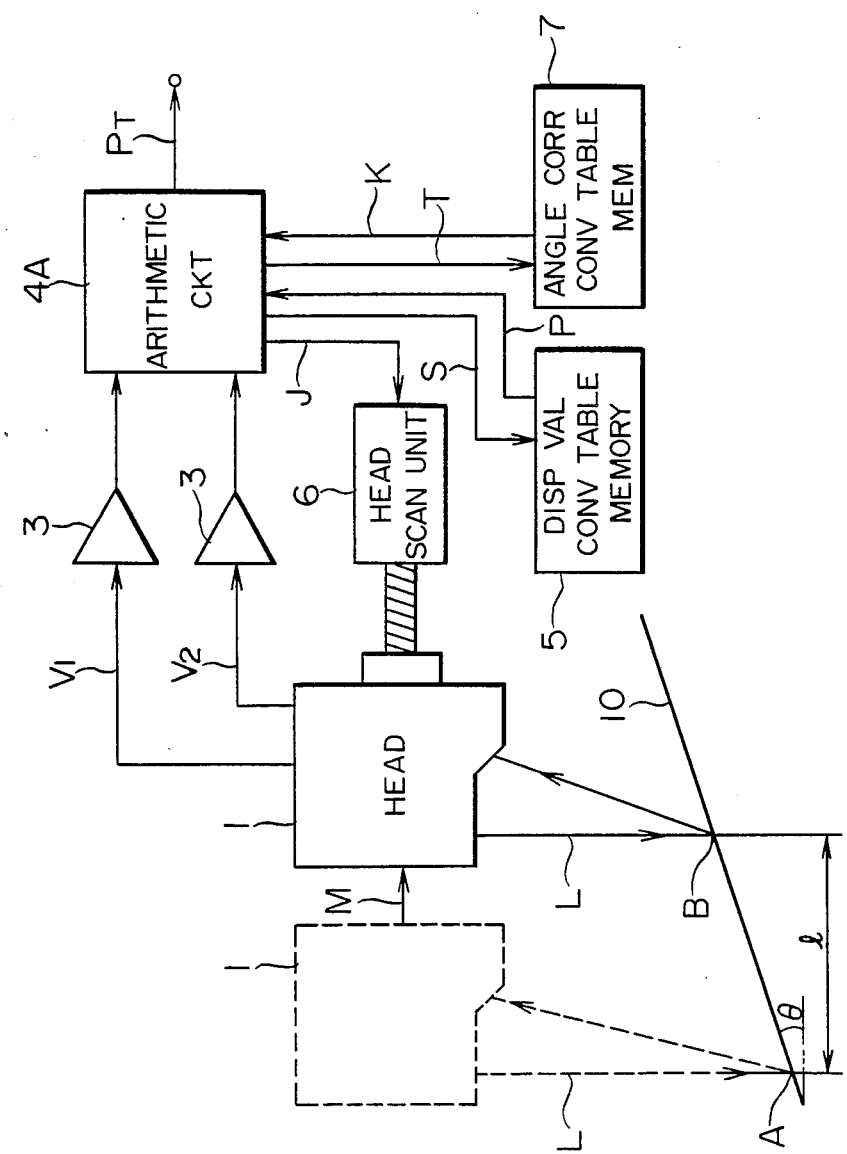
FIG. 1 is a block diagram showing an embodiment of this invention.
Figure 5:
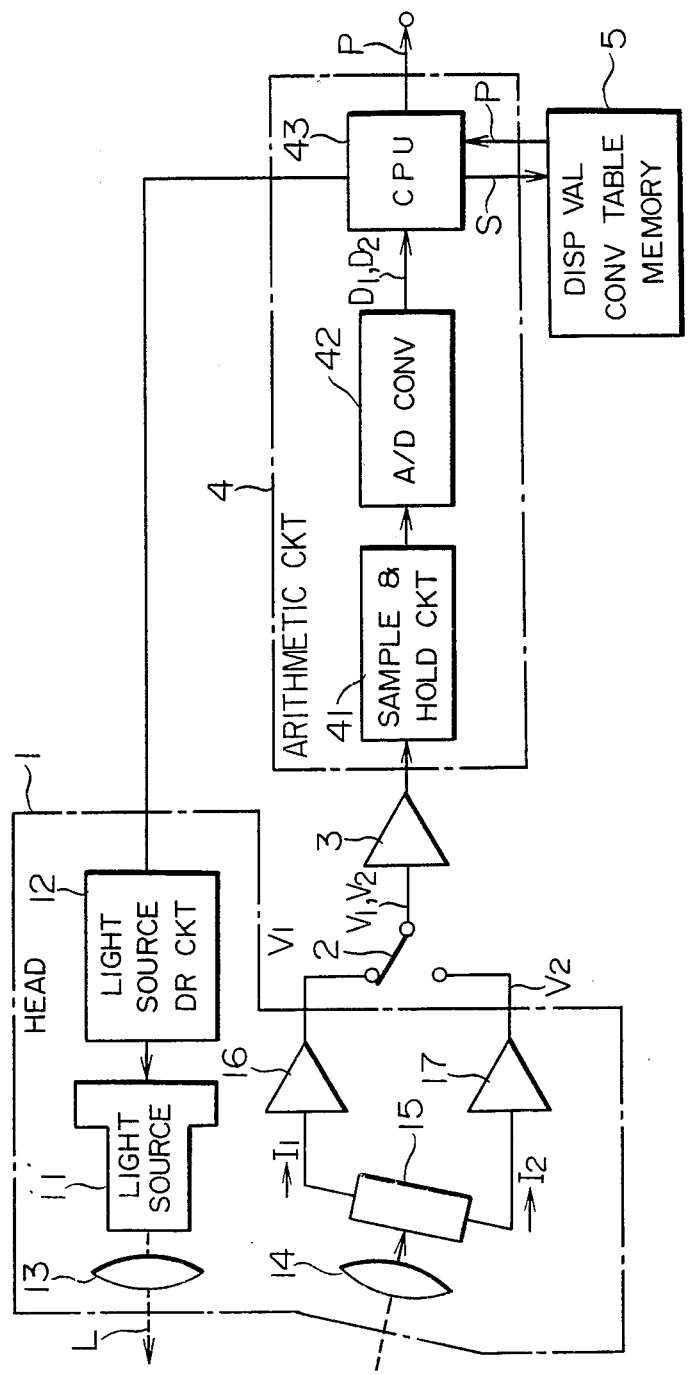
FIG. 5 is a block diagram showing an optical type displacement measuring apparatus in a prior art.

Now, an embodiment of this invention will be described with reference to the drawings. FIG. 1 is a block diagram showing one embodiment of this invention, in which numerals 1, 3, 5 and 10 indicate components similar to the foregoing, respectively. Besides, an arithmetic circuit 4A replaces the arithmetic circuit 4 in FIG. 5. It includes a plurality of sample-and-hold circuits 41 as well as A/D converters 42, which correspond to respective voltage signals $V_1$ and $V_2$, and a CPU 43. A program stored in the CPU 43 differs from one in the prior art.

A head scanning unit 6 scans and moves the head 1 on the basis of a scanning signal J from the arithmetic circuit 4A. Since the head scanning unit 6 moves the head 1 relative to the object to-be-measured 10, this object 10 may well be scanned and moved.

An angle correction conversion table memory 7 connected to the arithmetic circuit 4A stores therein correctional coefficients K which correspond to an angle signal T expressive of the inclination angle $\theta$ of the object to-be-measured 10.

Next, the operation of the embodiment of this invention shown in FIG. 1 will be described with reference to FIG. 2 illustrative of the contents of the displacement value conversion table memory 5 and FIG. 3 illustrative of the contents of the angle correction conversion table memory 7.

First, the arithmetic circuit 4A generates the predetermined scanning signal J, in response to which the head scanning unit 6 moves and scans the head 1 along the object to-be-measured 10 at a fixed speed in the direction of an arrow M.

It is now assumed that, at a certain point of time, the head 1 lies at a position indicated by a broken line in FIG. 1 and measures the displacement value $P_A$ of the point A of the object to-be-measured 10. On this occasion, voltage signals $V_{A1}$ and $V_{A2}$ from the head 1 are input to the arithmetic circuit 4A and are respectively converted into digital signals $D_{A1}$ and $D_{A2}$ as in the foregoing. Then, on the basis of Eq. (1), $$S_A = (D_{A1} - D_{A2})/(D_{A1} + D_{A2})$$

is calculated to obtain the displacement signal $S_A$ of the point A, and the displacement value $P_A$ of the point A corresponding to the displacement signal $S_A$ is found by referring to the displacement value conversion table memory 5.

Subsequently, in a case where the head 1 moves a distance l in the direction of the arrow M (to a position of solid line) and measures the displacement value $P_B$ of the point B of the object to-be-measured 10, the arithmetic circuit 4A calculates:

$$S_B = (D_{B1} - D_{B2})/(D_{B1} + D_{B2})$$

using digital signals $D_{B1}$ and $D_{B2}$ respectively based on voltage signals $V_{B1}$ and $V_{B2}$, to obtain the displacement signal $S_B$ of the point B, and it finds the displacement value $P_B$ of the point B by reference to the displacement value conversion table memory 5.

Figure 7:
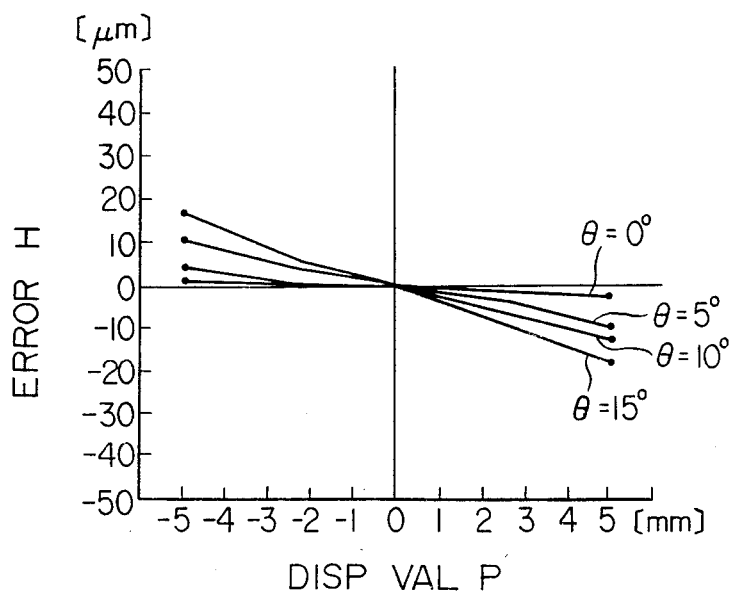
FIG. 7 is a graph showing the errors of displacement values.

On this occasion, the displacement value $P_B$ contains an error H (refer to FIG. 7) due to the inclination angle $\theta$ of the object to-be-measured 10 and therefore needs to be corrected. Accordingly, the arithmetic circuit 4A evaluates the tangent, tan $\theta$ (angle signal T) of the inclination angle $\theta$ of the object to-be-measured 10 from:

$$\tan \theta = (P_B - P_A)/l \qquad (2)$$

and it derives the corresponding correctional coefficients K from the angle correction conversion table memory 7 (refer to FIG. 3). Illustrated here is a case where the data of the error H in FIG. 7 is expressed by an approximate equation of order n (=3) with the displacement value P taken as a variable every inclination angle $\theta$, as follows:

$$H = a\,P^3 + b\,P^2 + c\,P + d \qquad (3)$$

The correctional coefficients K are given by $a_1$, $b_1$, $c_1$ and $d_1$ for the coefficients a–d of the respective terms.

Thus, pursuant to Eq. (3), the error $H_B$ contained in the displacement value $P_B$ of the point B is evaluated by:

$$H_B = a_1 P_B^3 + b\,P_B^2 + c_1 P_B d_1$$

The true displacement value $P_{BT}$ of the point B becomes:

$$P_{BT} = P_B - H_B \qquad (4)$$

Here, unless the point A is a measurement start point, the displacement value $P_A$ has its error already corrected, and hence, the inclination angle $\theta$ is obtained more accurately. In this way, the displacement values $P_T$ of a plurality of points on the object to-be-measured 10 are successively and accurately measured at the intervals of the distance l and delivered from the arithmetic circuit 4A as outputs.

In the above embodiment, in order to obtain the angle signal T expressive of the inclination angle θ, the points A and B, for example, have been measured, and the calculation has been executed on the basis of the data of every sampled point. However, the angle signal T may well be calculated using the average value of the displacement values P of a plurality of sampled points.

Figure 4:
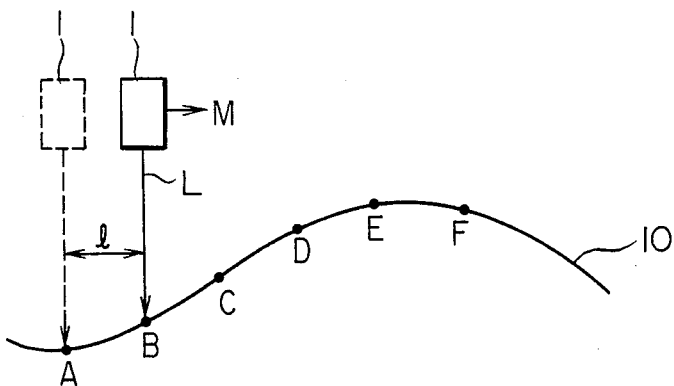
FIG. 4 is an explanatory view showing another embodiment of this invention.
Figure 6:
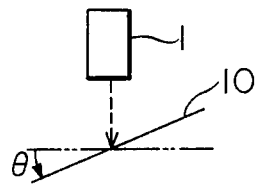
FIG. 6 is an explanatory view showing the inclination angle of an object to-be-measured.

In this case, even when the errors H of the respective displacement values P enlarge under the influence of the surface of the object to-be-measured 10 on account of the behaviors (shape, material, etc.) thereof, as illustrated in FIG. 4, the angle signal T appropriately expressing the inclination angle θ can be obtained. By way of example, in a case where the displacement value P is found by the average of four times of movements, the average displacement value $P_D'$ of a point D is afforded by the average value of the sum in which the respective displacement values $P_A$-$P_C$ of three preceding points A-C are added to the displacement value $P_D$ of the point D, as follows:

$$P_D' = (P_A + P_B + P_C + P_D)/4$$

Likewise, the respective average displacement values $P_E'$ and $P_F'$ of points E and F become:

$$P_E' = (P_B + P_C + P_D + P_E)/4$$

$$P_F' = (P_C + P_D + P_E + P_F)/4$$

Thus, tan θ expressive of the inclination angle θ between, for example, the points D and E is calculated on the basis of the average displacement values $P_D'$ and $P_E'$ and has the influence ascribable to the behaviors of the object to-be-measured 10 eliminated. Also, the influence of the noise of the electronic circuit including a PSD 15 can be reduced by the averaging process.

Moreover, although the tangent, tan θ has been employed as the angle signal T for correcting the angle, it is also allowed to calculate the inclination angle θ between, for example, the points A and B from:

$$\theta = \tan^{-1}[(P_B - P_A)/l]$$

and to evaluate the correctional coefficients K on the basis of this inclination angle θ.

Further, although the displacement signal S has been calculated after the conversion of the respective voltage signals $V_1$ and $V_2$ into the digital signals $D_1$ and $D_2$ in the arithmetic circuit 4A, it may well be calculated without the conversion of the analog signals.

As described above, according to this invention, an optical type displacement measuring apparatus is furnished with an angle correction conversion table memory which stores therein correctional coefficients corresponding to angle signals expressive of the inclination angles of objects to-be-measured, in addition to a displacement value conversion table memory, and it is further furnished with a head scanning unit which moves a head relative to an object to-be-measured, and an arithmetic circuit which drives the head scanning unit and which calculates an angle signal on the basis of displacement values at a plurality of points and corrects the displacement values on the basis of correctional coefficients corresponding to this angle signal, the corrected displacement values being delivered as outputs. Therefore, the invention is effective to provide the optical type displacement measuring apparatus which can correct the displacement values of the respective points in accordance with the inclination angle of the object to-be-measured and which can deliver the accurate displacement values at all times irrespective of the surface state of the object to-be-measured.

What is claimed is:

1. In an optical type displacement measuring apparatus wherein a displacement value from a head to an object to-be-measured is found on the basis of two channels of voltage signals which are obtained in such a way that a light beam is projected from the head having a position sensing device (PSD) toward the object to-be-measured and that either of regularly reflected light and scattered light from the object to-be-measured is received by the PSD;

an optical type displacement measuring apparatus comprising:

a displacement value conversion table memory which stores therein displacement values corresponding to displacement signals based on the voltage signals, an angle correction conversion table memory which stores therein correctional coefficients corresponding to angle signals expressive of inclination angles of the objects to-be-measured, a head scanning unit which moves said head relative to the object to-be-measured, and an arithmetic circuit which drives said head scanning unit, and which calculates the displacement signal on the basis of the voltage signals, calculates the angle signal on the basis of the displacement values for a plurality of points on the object to-be-measured and corrects the displacement values on the basis of the correctional coefficients corresponding to this angle signal, the corrected displacement values being delivered as outputs.

* * * * *